(12) United States Patent
Hoshino et al.

(10) Patent No.: US 11,776,756 B2
(45) Date of Patent: Oct. 3, 2023

(54) CERAMIC ELECTRONIC COMPONENT, SUBSTRATE ARRANGEMENT AND METHOD OF MANUFACTURING CERAMIC ELECTRONIC COMPONENT

(71) Applicant: TAIYO YUDEN CO., LTD., Tokyo (JP)

(72) Inventors: Ryosuke Hoshino, Tokyo (JP); Satoshi Kobayashi, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 68 days.

(21) Appl. No.: 17/591,389

(22) Filed: Feb. 2, 2022

(65) Prior Publication Data

US 2022/0262570 A1  Aug. 18, 2022

(30) Foreign Application Priority Data

Feb. 17, 2021 (JP) .................. 2021-023130

(51) Int. Cl.

| | |
|---|---|
| *H01G 4/30* | (2006.01) |
| *H01G 4/012* | (2006.01) |
| *C04B 35/64* | (2006.01) |
| *H01G 4/008* | (2006.01) |
| *H01G 2/06* | (2006.01) |
| *H01G 4/12* | (2006.01) |

(52) U.S. Cl.
CPC .............. *H01G 4/30* (2013.01); *C04B 35/64* (2013.01); *H01G 2/065* (2013.01); *H01G 4/008* (2013.01); *H01G 4/012* (2013.01); *H01G 4/1218* (2013.01)

(58) Field of Classification Search
CPC .......... H01G 4/30; H01G 2/065; H01G 4/008; H01G 4/012; H01G 4/1218; C04B 35/64
See application file for complete search history.

(56) References Cited

U.S. PATENT DOCUMENTS

| | | | | |
|---|---|---|---|---|
| 6,808,813 | B2 * | 10/2004 | Kimura ................ | H01G 4/005 |
| | | | | 427/430.1 |
| 10,395,840 | B1 * | 8/2019 | Park ...................... | H01G 2/065 |

(Continued)

FOREIGN PATENT DOCUMENTS

| | | |
|---|---|---|
| JP | H 10-289837 A | 10/1998 |
| JP | 2000-182879 A | 6/2000 |

(Continued)

*Primary Examiner* — Michael P McFadden
(74) *Attorney, Agent, or Firm* — Stein IP, LLC

(57) ABSTRACT

A ceramic electronic component includes an element body, and first and second external electrodes formed on the element body. The element body has a dielectric, and first and second internal electrodes. The first external electrode includes a first base layer formed on the element body. The first base layer is connected to the first internal electrode and an edge of the first baser layer is present on a first surface of the element body. The first external electrode also includes a first plating layer formed on the first base layer. An edge of the first plating layer is present on the first surface of the element body at a position different from a position of the edge of the first base layer in a direction perpendicular to the first surface. The second external electrode has a similar structure to the first external electrode.

19 Claims, 8 Drawing Sheets

(56) References Cited

U.S. PATENT DOCUMENTS

| | | | | |
|---|---|---|---|---|
| 2013/0050895 A1* | 2/2013 | Tezuka | ............... | H01G 4/30 |
| | | | | 156/247 |
| 2013/0088810 A1* | 4/2013 | Yang | ............... | H01G 4/2325 |
| | | | | 361/306.3 |
| 2013/0294010 A1* | 11/2013 | Lee | ............... | H01G 4/30 |
| | | | | 29/25.42 |
| 2021/0183581 A1* | 6/2021 | Nakano | ............... | H01G 2/065 |
| 2021/0319953 A1* | 10/2021 | Oh | ............... | H01G 4/30 |

FOREIGN PATENT DOCUMENTS

| | | |
|---|---|---|
| JP | 2016-009836 A | 1/2016 |
| JP | 2017-152623 A | 8/2017 |

\* cited by examiner

CERAMIC ELECTRONIC COMPONENT, SUBSTRATE ARRANGEMENT AND METHOD OF MANUFACTURING CERAMIC ELECTRONIC COMPONENT

CROSS-REFERENCE TO RELATED APPLICATIONS

This application claims the benefit of Japanese Application No. 2021-023130, filed Feb. 17, 2021, in the Japanese Patent Office. All disclosures of the document named above are incorporated herein by reference.

FIELD OF THE INVENTION

The present invention relates to a ceramic electronic component, a substrate arrangement, and a method of manufacturing the ceramic electronic component.

DESCRIPTION OF THE RELATED ART

A multilayer ceramic capacitor generally includes a ceramic element body in which a plurality of internal electrodes are arranged, and external electrodes formed on surfaces of the ceramic element body. The external electrodes are connected to the internal electrodes in the ceramic element body. As the external electrodes are attached to a mounting substrate by solder or the like, the multilayer ceramic capacitor is mounted on the mounting substrate.

JP-A-2000-182879 discloses a terminal electrode that has a multilayer structure, which includes a first electrode layer and a second electrode layer. The second electrode layer is made from a conductive resin. A distal end of a covered portion of the second electrode layer is extended 50 µm or more toward the other terminal electrode than the distal end of the covered portion of the first electrode layer.

JP-A-2016-9836 discloses a structure to prevent cracking in that portion of a ceramic element body which corresponds to a free end of an external electrode wrapped around the ceramic element body. To this end, JP-A-2016-9836 includes a resin layer between the side face of the ceramic element body and a surface of the external electrode.

SUMMARY OF THE INVENTION

In JP-A-2000-182879, a third electrode layer having a two-layer structure (a stack of a Ni plating layer and a solder plating layer) is formed on the second electrode layer. Thus, the distal end of the first electrode layer and the distal end of the third electrode layer are located on a same plane. As a result, a stress exerted on the first electrode layer and a stress exerted on the third electrode layer tend to be concentrated at a same point on the ceramic element body. This may cause cracking in the ceramic element body.

In JP-A-2016-9836, in order to provide the resin layer between the distal end region of the wraparound portion of the external electrode and the surface of the ceramic element body, it is necessary to form a gap between the distal end region of the wraparound portion of the external electrode and the surface of the ceramic element body.

JP-A-2017-152623 discloses a structure that has an external electrode extending from a first surface to a fifth surface of a main body of a capacitor and another external electrode extending from a second surface to the fifth surface of the main body of the capacitor. JP-A-Hei-10-289837 discloses a structure that has external electrodes formed on only one end face of a substrate.

An objective of the present invention is to provide a ceramic electronic component that can reduce stresses exerted on an element body through external electrodes. Another objective of the present invention is to provide a method of manufacturing such ceramic electronic component. Still another objective of the present invention is to provide a circuit board arrangement that includes the ceramic electronic component and can reduce stresses exerted on the element body of the ceramic electronic component through the external electrodes.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purposes of the present invention, as embodied and broadly described, in one aspect, the present disclosure provides a ceramic electronic component that includes an element body, a first external electrode and a second external electrode. The element body includes a dielectric, at least one first internal electrode and at least one second internal electrode. The element body has a plurality of surfaces including at least one first surface and two side surfaces (opposite side surfaces). The first and second external electrodes are formed on the element body. The first external electrode includes a first base layer formed on the element body such that the first base layer is connected to the first internal electrode(s) and an edge of the first baser layer is present on the first surface of the element body. The first external electrode also includes a first plating layer formed on the first base layer such that an edge of the first plating layer is present on the first surface of the element body at a position different from a position of the edge of the first base layer in a direction perpendicular to the first surface of the element body. The second external electrode includes a second base layer formed on the element body such that the second base layer is connected to the second internal electrode(s) and an edge of the second baser layer is present on the first surface of the element body. The second external electrode also includes a second plating layer formed on the second base layer such that an edge of the second plating layer is present on the first surface of the element body at a position different from a position of the edge of the second base layer in the direction perpendicular to the first surface of the element body.

The element body may have at least one first step or inclined surface on the first surface between the position of the edge of the first base layer and the position of the edge of the first plating layer. The element body may have at least one second step or inclined surface on the first surface between the position of the edge of the second base layer and the position of the edge of the second plating layer.

The first internal electrode(s) may be exposed in one of the opposite side surfaces of the element body. The second internal electrode(s) may be exposed in the other of the opposite side surfaces of the element body. The first external electrode may be formed on the above-mentioned one of the opposite side surfaces and may extend onto adjacent areas on other surfaces of the element body including the first surface. The second external electrode may be formed on the other of the opposite side surfaces and may extend onto adjacent areas on the other surfaces of the element body including the first surface.

The first internal electrode(s) may be exposed in one of the opposite side surfaces of the element body. The second internal electrode(s) may be exposed in the other of the opposite side surfaces of the element body. The first external electrode may be formed on the above-mentioned one of the opposite side surfaces and may extend onto an adjacent area on one of other surfaces of the element body including the first surface. The second external electrode may be formed on the other of the opposite side surfaces and may extend onto an adjacent area on the above-mentioned one of the other surfaces of the element body including the first surface.

The first and second internal electrodes may be exposed in only one of the surfaces of the element body. The first and second external electrodes may be formed on the above-mentioned only one surface and spaced from each other.

A thickness of the element body may be measured in the direction perpendicular to the first surface of the element body. The thickness of the element body may be greater at a first area covered with the first base layer than at a second area which is not covered with the first base layer, and may be greater at a third area covered with the second base layer than at the second area.

A difference between the position of the edge of the first plating layer and the position of the edge of the first base layer in the direction perpendicular to the first surface of the element body may be between 0.5 μm and 2.0 μm. A difference between the position of the edge of the second plating layer and the position of the edge of the second base layer in the direction perpendicular to the first surface of the element body may be between 0.5 μm and 2.0 μm.

The first plating layer may have a first sub-layer of plating formed on the first base layer and a second sub-layer of plating formed on the first sub-layer. The second plating layer may have a third sub-layer of plating formed on the second base layer and a fourth sub-layer of plating formed on the third sub-layer. A position of an edge of the first sub-layer and a position of an edge of the second sub-layer may be different from the position of the edge of the first base layer in the direction perpendicular to the first surface of the element body. A position of an edge of the third sub-layer and a position of an edge of the fourth sub-layer may be different from the position of the edge of the second base layer in the direction perpendicular to the first surface of the element body.

A wrap-around angle of the first sub-layer from the edge of the first base layer to the first surface of the element body may be between 180 degrees and 270 degrees. A wrap-around angle of the third sub-layer from the edge of the second base layer to the first surface of the element body may be between 180 degrees and 270 degrees.

The first plating layer may further include a fifth sub-layer of plating formed on the second sub-layer. The second plating layer may further include a sixth sub-layer of plating formed on the fourth sub-layer. The position of the edge of the first sub-layer, the position of the edge of the second sub-layer and a position of an edge of the fifth sub-layer may be different from the position of the edge of the first base layer in the direction perpendicular to the first surface of the element body. The position of the edge of the third sub-layer, the position of the edge of the fourth sub-layer and a position of an edge of the sixth sub-layer may be different from the position of the edge of the second base layer in the direction perpendicular to the first surface of the element body.

Each of the first and second plating layers may be made from Cu, Fe, Zn, Al, Ni, Pt, Pd, Ag, Au or Sn, or an alloy including at least one of Cu, Fe, Zn, Al, Ni, Pt, Pd, Ag, Au and Sn.

Each of the first and second external electrodes may be made from Cu, Fe, Zn, Al, Ni, Pt, Pd, Ag, Au or Sn, or an alloy including at least one of Cu, Fe, Zn, Al, Ni, Pt, Pd, Ag, Au and Sn. Each of the first and second internal electrodes may be made from Cu, Fe, Zn, Al, Ni, Pt, Pd, Ag, Au or Sn, or an alloy including at least one of Cu, Fe, Zn, Al, Ni, Pt, Pd, Ag, Au and Sn.

A main component of the dielectric may be barium titanate, strontium titanate, calcium titanate, magnesium titanate, strontium barium titanate, calcium barium titanate, calcium zirconate, barium zirconate, calcium zirconate titanate or titanium dioxide.

A main component of each of the first and second base layers may be Ni.

Each of the first and second base layers may have a co-material containing the dielectric as its main component.

An external size of the ceramic electronic component may be any one of 0201 size to 5750 size.

The first internal electrodes and the second internal electrodes may be alternately stacked, with a dielectric layer containing the dielectric being interposed between each of the first and second internal electrode layers. The first external electrode may be connected to the first internal electrode layers. The second external electrode may be provided separately from the first external electrode and may be connected to the second internal electrode layers.

The element body may have a length direction that is perpendicular to the opposite side faces and a width direction that is perpendicular to the length direction. The element body may further include an upper cover layer that contains the dielectric and a lower cover layer that contains the dielectric such that the upper cover layer may be provided on top of a stack of the first and second internal electrode layers. The lower cover layer may be provided below the stack. The first surfaces of the element body may include a surface of the upper cover layer and a surface of the lower cover layer. The first steps or inclined surfaces may include two first steps or inclined surfaces. The second steps or inclined surfaces may include two second steps or inclined surfaces. One of the two first steps or inclined surfaces may be formed on the surface of the upper cover layer and the other may be formed on the surface of the lower cover layer. One of the two second steps of inclined surfaces may be formed on the surface of the upper cover layer and the other may be formed on the surface of the lower cover layer. The element body may further include a pair of margin portions that contain the dielectric and sandwich the stack of the first and second internal electrode layers in the width direction of the element body. A third step or inclined surface may be formed on a surface of one of the pair of margin portions such that an edge of the first plating layer may be present on the surface of the one of the pair of margin portions at a position different from a position of the edge of the first base layer in the width direction of the element body. A fourth step or inclined surface may be formed on a surface of the other of the pair of margin portions such that an edge of the first plating layer may be present on the surface of the other of the pair of margin portions at a position different from a position of the edge of the first base layer in the width direction of the element body. A fifth step or inclined surface may be formed on the surface of the one of the pair of margin portions such that an edge of the second plating layer may be present on the surface of the one of the pair of margin portions at a position different from a position of the edge of the second base layer in the width direction of the element body. A sixth step or inclined surface may be formed on a surface of the other of the pair of margin portions such that an edge of the second plating layer may be present on the surface of the other of the pair of margin portions at a position different from a position of the edge of the second base layer in the width direction of the element body. One of the first surfaces may be a top surface of the element body, and the other may be a bottom surface of the element body.

In another aspect, the present disclosure provides a device that includes a mounting substrate, at least one solder layer attached to the mounting substrate, and the above-described ceramic electronic component. The ceramic electronic component is mounted on the mounting substrate via the solder layer(s). The device may be referred to as a circuit board arrangement.

In still another aspect, the present disclosure provides a method of manufacturing a ceramic electronic component. The method includes forming an element body that has six surfaces. The six surfaces include two side surfaces. The element body includes a dielectric and at least one internal electrode. The internal electrode(s) is exposed in each of the two side surfaces of the element body. The method also includes applying a base material, which will become a base layer for each of at least one external electrode, to the side surfaces of the element body and certain portions on the remaining four surfaces. The method also includes sintering the base material to form the base layer for the external electrode(s). The method also includes etching the element body in an area which is not covered with the base layer to form a step or inclined surface on the element body. The method also includes forming a plating layer on the base layer such that the plating layer covers the step or inclined surface and an edge of the plating layer contacts an etched surface of the element body.

According to the present invention, the stress(es) applied to the element body through the external electrode(s) can be reduced.

It is to be understood that both the foregoing general description and the following detailed description are exemplary and explanatory, and are intended to provide further explanation of the invention as claimed.

DESCRIPTION OF THE EMBODIMENTS

Embodiments of the present invention will be described in detail below with reference to the accompanying drawings. The following embodiments do not limit the invention, and not all combinations of features described in the embodiments may be essential to the configuration of the invention. The configurations of the embodiments may be modified or changed as appropriate depending on the specifications of the device to which the invention is applied and various conditions (operating conditions, operating environment, etc.). The scope of the present invention is not limited by the following individual embodiments. The drawings used in the following description may differ in scale and shape from the actual structure for the sake of easier understanding of the illustrated configurations.

First Embodiment

Figure 1:
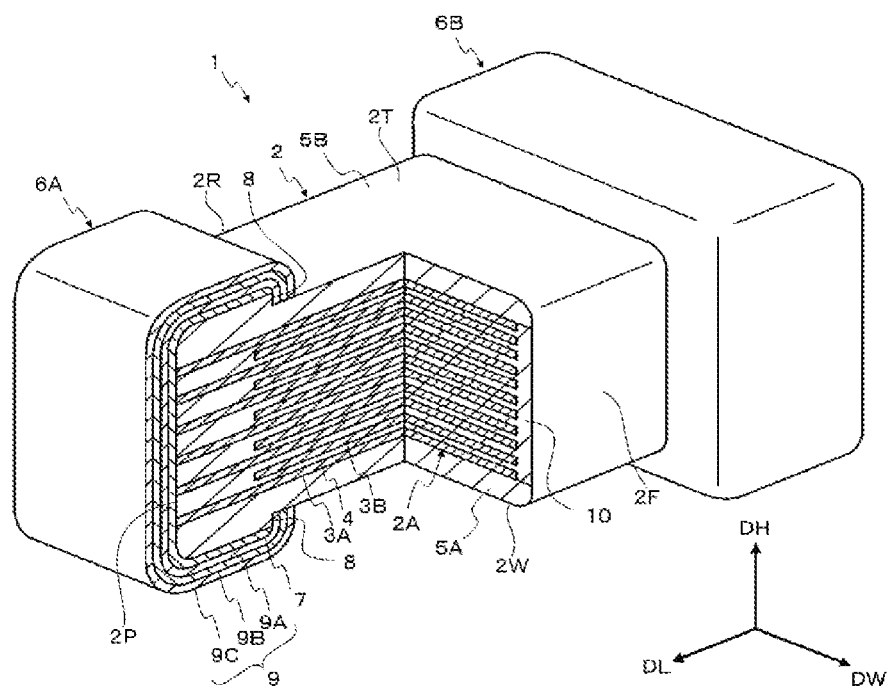
FIG. 1 is a perspective view of a multilayer ceramic capacitor according to a first embodiment of the present invention.
Figure 2:
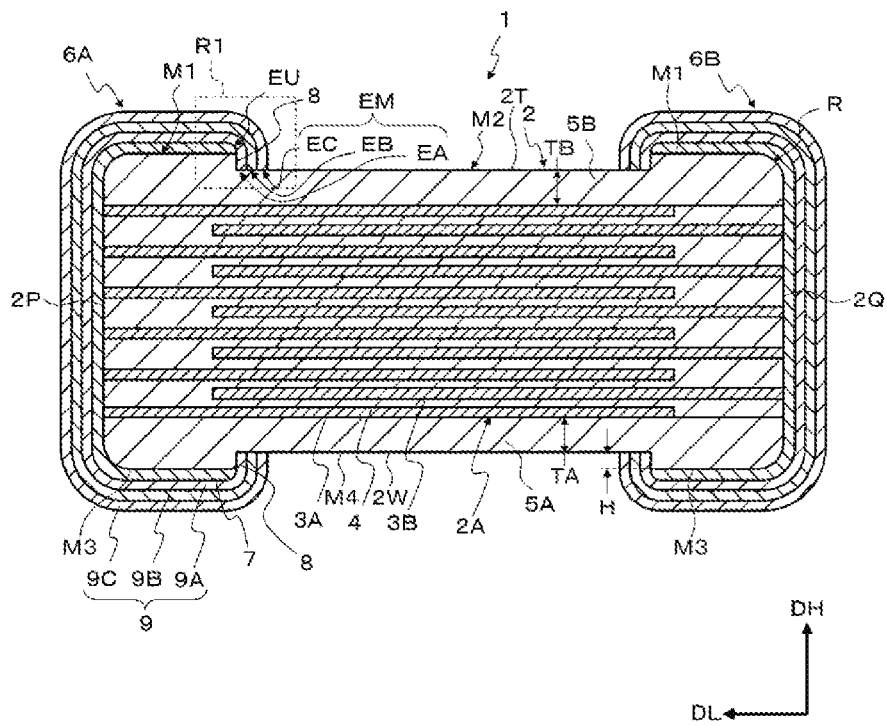
FIG. 2 is a cross-sectional view of the multilayer ceramic capacitor shown in FIG. 1, cut in a longitudinal direction of the multilayer ceramic capacitor.

FIG. 1 shows a multilayer ceramic capacitor 1 according to a first embodiment of the present invention. FIG. 2 shows a cross-sectional view of the multilayer ceramic capacitor 1 shown in FIG. 1 cut in the length direction DL of the capacitor 1.

In FIGS. 1 and 2, the multilayer ceramic capacitor 1 has an element body 2 and external electrodes 6A and 6B. The element body 2 has a laminate 2A, a lower cover layer 5A and an upper cover layer 5B. The laminate 2A has internal electrode layers 3A and 3B and dielectric layers 4.

The lower cover layer 5A is provided under the laminate 2A, and the upper cover layer 5B is provided on top of the laminate 2A. The internal electrode layers 3A and 3B are alternately stacked via the dielectric layers 4. FIGS. 1 and 2 show an example in which the inner electrode layers 3A and 3B are stacked for a total of eleven layers. However, the number of stacked inner electrode layers 3A and 3B is not limited to eleven. The shape of the element body 2 may be generally rectangular parallelepiped. In the following description, the element body 2 has six surfaces, namely, a front surface 2F, a rear surface 2R, a top surface 2T, a bottom surface 2W, a left surface 2P and a right surface 2Q. The top surface 2T and the bottom surface 2W may be referred to as first surfaces of the element body 2. The left surface 2P and the right surface 2Q may be referred to as opposite side surfaces of the element body 2. The shape of the laminate 2A may be generally rectangular parallelepiped.

In the following description, the length direction of the element body 2 is designated by DL, the width direction of the element body 2 is designated by DW, and the height direction of the element body 2 is designated by DH. The height direction DH is the direction in which the top and bottom surfaces 2T and 2W of the element body 2 face each other. When the multilayer ceramic capacitor 1 is mounted on a substrate (circuit board 11 in FIG. 9), the bottom surface 2W of the element body 2 may face a mounting surface of the substrate 11. The element body 2 may be chamfered along ridges of the element body 2. As a result of chamfering, the element body 2 has curved surfaces R at its chamfered corners, as shown in FIG. 2.

As shown in FIGS. 1 and 2, the external electrodes 6A and 6B are formed on the element body 2 such that the external electrodes 6A and 6B are separated from each other in the length direction DL. The left external electrode 6A generally covers the left surface 2P of the element body 2, and the right external electrode 6B generally covers the right surface 2Q of the element body 2. Specifically, the external electrode 6A extends from a left end area of the bottom surface 2W to a left end area of the top surface 2T of the element body 2 over the left surface 2P, and the external electrode 6B extends from a right end area of the bottom surface 2W to a right end area of the top surface 2T of the element body 2 over the right surface 2Q. Each of the external electrodes 6A and 6B may also extend onto the front surface 2F and/or the rear surface 2R of the element body 2.

In the length direction DL of the element body 2, the internal electrode layers 3A and 3B are alternately arranged at different positions in the laminate 2A. Specifically, when compared to the internal electrode layers 3B, the internal electrode layers 3A are arranged on the left side of the element body 2, i.e., the internal electrode layers 3A extend in the length direction DL from the left side surface 2P of the element body toward the right side surface 2Q. The internal electrode layers 3B are arranged on the right side of the element body 2, i.e., the internal electrode layer 3B extend in the length direction DL from the right side surface 2Q toward the left side surface 2P. The left end of each of the internal electrode layers 3A is exposed at the left side surface 2P of the element body 2 and is connected to the left external electrode 6A. The right end of each of the internal electrode layers 3B is exposed at the right side surface 2Q of the element body 2 and is connected to the right external electrode 6B.

In the width direction DW of the element body 2, the ends of the inner electrode layers 3A and 3B are covered with the dielectric layers 4. In the width direction DW, the ends of the inner electrode layers 3A and 3B may be aligned with each other, as shown in FIG. 1. In the width direction DW, therefore, the element body 2 has margin portions 10 (i.e., a front margin portion 10 and a rear margin portion 10; the front margin portion 10 is only illustrated in the drawing) that cover the inner electrode layers 3A and 3B.

The thickness of each of the inner electrode layers 3A and 3B in the height direction DH may be 0.05 µm to 25 µm. The thickness of each of the dielectric layers 4 in the height direction DH may also be 0.05 µm to 25 µm. For example, the thickness of the internal electrode layer 3A is 0.3 µm, the thickness of the internal electrode layer 3B is 0.3 µm, and the thickness of the dielectric layer 4 is 0.3 µm. The material of the inner electrode layers 3A and 3B may be, for example, a metal such as Cu (copper), Fe (iron), Zn (zinc), and Al (aluminum), Sn (tin), Al (aluminum), Sn (tin), Ni (nickel), Ti (titanium), Ag (silver), Au (gold), Pt (platinum), Pd (palladium), Ta (tantalum), and W (tungsten), or may be an alloy containing these metals.

The main component of the material of the dielectric layer 4 may be, for example, a ceramic material that has a perovskite structure. The main component may be contained 50 at % or more. The ceramic material of the dielectric layer 4 may be, for example, barium titanate, strontium titanate, calcium titanate, magnesium titanate, strontium barium titanate, calcium barium titanate, calcium zirconate, barium zirconate, calcium zirconate titanate or titanium oxide.

The main component of the material of each of the lower cover layer 5A and the upper cover layer 5B may be, for example, a ceramic material. The main component (i.e., the ceramic material) of each of the lower cover layer 5A and the upper cover layer 5B may be the same as the main component (i.e., the ceramic material) of the dielectric layer 4. The thickness TA of the lower cover layer 5A is preferably in the range from 5 µm to 30 µm, and the thickness TB of the upper cover layer 5B is preferably in the range from 5 µm to 30 µm.

Each of the external electrodes 6A and 6B has a base layer (underlayer) 7 formed on the element body 2 and a plating layer 9 layered on the base layer 7. The right and left base layers 7 are formed on the right side and the left side of the element body 2, respectively, such that the right and left base layers 7 are separated from each other in the length direction DL. The left base layer 7 is connected to the internal electrode layers 3A, and the right base layer 7 is connected to the internal electrode layers 3B. The left base layer 7 is formed on the left surface 2P of the element body 2 and also on adjacent areas of the top surface 2T, bottom surface 2W, front surface 2F and rear surface 2R. Similarly, the right base layer 7 is formed on the right surface 2Q of the element body 2 and also on adjacent areas of the top surface 2T, bottom surface 2W, front surface 2F and rear surface 2R of the element body 2. In other words, each of the base layers 7 may extend continuously from the bottom surface 2W to the top surface 2T over the side surface 2P (or 2Q), and also extend from the side surface 2P (2Q) to the front surface 2F and the rear surface 2R of the element body 2. The left base layer 7 may be referred to as a first base layer and the right base layer 7 may be referred to as a second base layer.

The main component of the metal used as the conductive material of the base layer 7 may contain at least one of, for example, Cu, Fe, Zn, Al, Ni, Pt, Pd, Ag, Au and Sn or may contain an alloy that includes at least one of these metals. The base layer 7 may include a co-material which is mixed with the metal(s) of the base layer 7. The co-material may be present in the form of a plurality of islands in the base layer 7. If the co-material is present in the base layer 7 in the form of the islands, the co-material can reduce the difference in the thermal expansion coefficient between the element body 2 and the base layer 7, and can alleviate the stress on the base layer 7. The co-material is, for example, the ceramic component, which is the main component of the dielectric layer 4. The base layer 7 may contain a glass component. If the glass component is mixed in the base layer 7, the glass component can densify the base layer 7. This glass component is, for example, an oxide of Ba (barium), Sr (strontium), Ca (calcium), Zn, Al, Si (silicon) or B (boron).

The base layer 7 is preferably composed of a metal sintered body. This makes it possible to make the base layer 7 thicker while ensuring adhesion between the element body 2 and the base layer 7, and to ensure conductivity with the internal electrode layers 3A and 3B while ensuring the strength of the external electrodes 6A and 6B.

Figure 9:
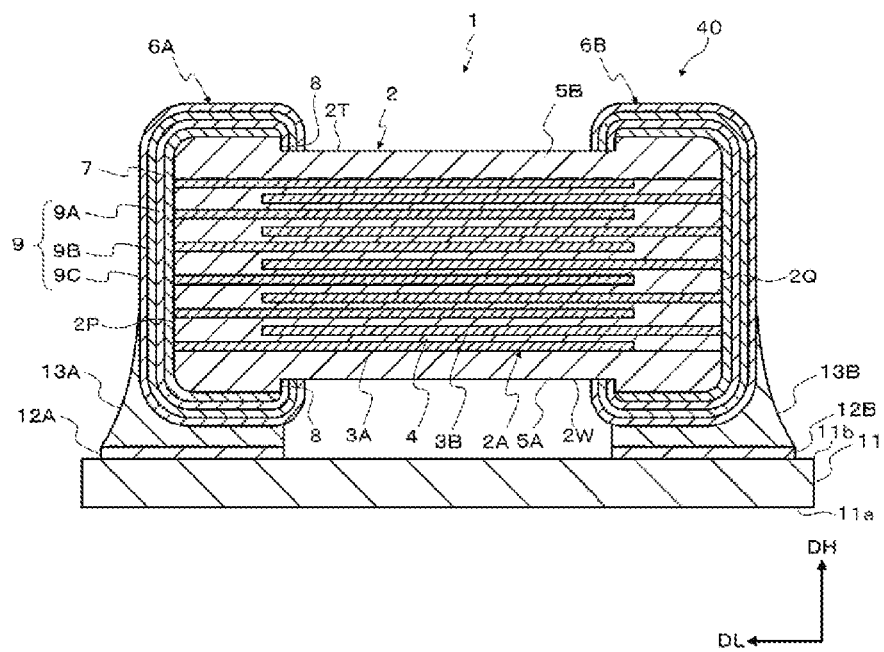
FIG. 9 is a cross-sectional view of a device according to a fourth embodiment of the present invention, which includes a substrate and a multilayer ceramic capacitor mounted on the substrate.

The left and right plating layers 9 are formed for the left and right external electrodes 6A and 6B, respectively, such that the left plating layer 9 covers the left base layer 7 and the right plating layer 9 covers the right base layer 7. The left plating layer 9 conducts with the internal electrode layers 3A through the left base layer 7, and the right plating layer 9 conducts with the internal electrode layers 3B through the right base layer 7. When the capacitor 1 is mounted on the substrate 11 (FIG. 9), each of the plating layers 9 conducts with a terminal 12A, 12B (FIG. 9) of the substrate 11 via solder 13A, 13B (FIG. 9).

The material of the plating layer 9 includes at least one of, for example, Cu, Fe, Zn, Al, Ni, Pt, Pd, Ag, Au and Sn, or an alloy containing at least one selected from these metals. The plating layer 9 may be a plating layer made from a single metal component or have a multi-layer structure, which includes a plurality of sub-layers made from different metal components from each other. In FIG. 1, the plating layer 9 has a three-layer structure. Specifically, the plating layer 9 includes a Cu plating layer 9A formed on the base layer 7, an Ni plating layer 9B formed on the Cu plating layer 9A, and an Sn plating layer 9C formed on the Ni plating layer 9B. The Cu plating layer 9A can improve the adhesiveness of the plating layer 9 to the base layer 7. The Ni plating layer 9B can improve the heat resistance of the external electrode 6A, 6B during soldering. The Sn plating layer 9C can improve the wettability of the solder to the plating layer 9. Each of the plating layers 9A-9C may be referred to as a sub-layer of the plating layer 9. It should be noted that the three-layer structure of the plating layer 9 is a mere example of a multilayer structure, and the plating layer 9 may have a two-layer structure or a four (or more) layer structure rather than the three-layer structure.

As shown in FIG. 2, the element body 2 has a turned "I" shape. Specifically, the top surface 2T of the element body 2 has two protruding portions M1 on its right and left, and an intermediate portion M2 between the two protruding portions M1. An edge EU of each of the base layers 7 is situated on the protruding portion M1 of the top surface 2T of the element body 2, and an edge EM of each of the plating layers 9 is situated on the intermediate portion M2 of the top surface 2T of the element body 2. Thus, the position of the edge EU of the base layer 7 is different from the position of the edge EM of the plating layer 9 in the height direction DH. The term "edge" of the base layer 7 refers to an end face of the base layer 7, and the "edge" of the plating layer 9 refers to the end face of the plating layer 9. The same structure is seen on the bottom surface 2W of the element body 2. Specifically, the bottom surface 2W of the element body 2 has two protruding portions M3 on its right and left, and an intermediate portion M4 between the two protruding portions M3. The lower edge EU of each of the base layers 7 is situated on the protruding portion M3 of the bottom surface 2W of the element body 2, and the lower edge EM of each of the plating layers 9 is situated on the intermediate portion M4 of the bottom surface 2W of the element body 2. Thus, the position of the lower edge EU of the base layer 7 is different from the position of the lower edge EM of the plating layer 9 in the height direction DH. The front surface 2F of the element body 2 may have the same structure and/or the rear surface 2R of the element body 2 may have the same structure. If the front surface 2F of the element body 2 has two protruding portions and an intermediate portion between the two protruding portions, the two protruding portions protrude in the width direction DW and therefore the position of the edge EU of the base layer 7 is different from the position of the edge EM of the plating layer 9 in the width direction DW.

Figure 3A:
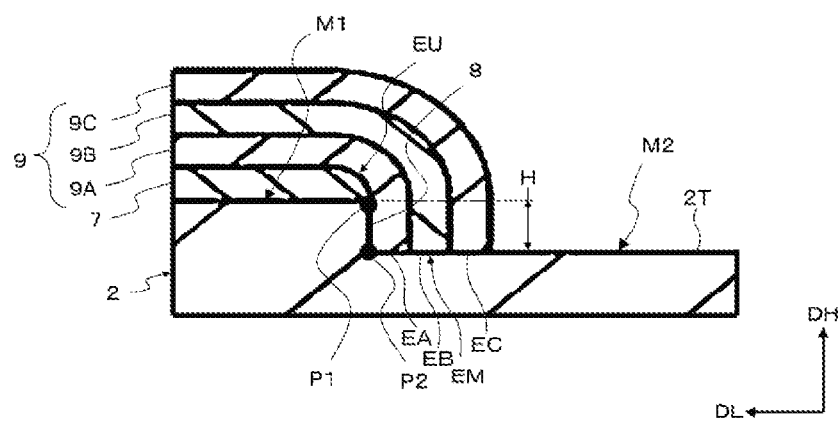
FIG. 3A is an enlarged cross-sectional view of a certain area in FIG. 2 to show stress loading points when there are steps on a surface of an element body of the capacitor.

FIG. 3A shows an enlarged view of an area R1 in FIG. 2. As shown in FIG. 3A, an edge EA of the Cu plating layer 9A, an edge EB of the Ni plating layer 9B and an edge EC of the Sn plating layer 9C have different positions from the edge EU of the base layer 7 in the height direction DH (in the direction normal to the top surface 2T of the element body 2). The edges EA, EB and EC of the sub-layers 9A, 9B and 9C and the edge EU of the base layer 7 are situated on the element body 2. The edges EA, EB and EC of the sub-layers 9A, 9B and 9C are closer to the center of the element body 2 than the edge EU of the base layer 7.

As described above, the edge EU of the base layer 7 and the edge EM of the plating layer 9 have different positions in the direction normal to the particular surface (the top surface 2T in FIG. 3A) of the element body 2. Thus, a stress loading point P1 of the base layer 7 and a stress loading point P2 of the plating layer 9 are not present on the same plane of the element body 2. The stress loading point is the point where the stress applied to the element body 2 from the base layer 7 or the plating layer 9 is the greatest, and the stress loading point is likely to become a starting point of cracking. Therefore, the configuration of the capacitor 1 of this embodiment is able to disperse the stresses applied to the element body 2 through the external electrodes 6A and 6B, and suppress or prevent the cracking that would otherwise occur in the element body 2.

As shown in FIG. 3A, a step 8 is formed on the top surface 2T of the element body 2 because the position of the edge EU of the base layer 7 is different from the position of the edge EM of the plating layer 9 in the normal direction of the top surface 2T (height direction DH) of the element body 2. The step 8 is provided between the edge EU of the base layer 7 and the edge EM of the plating layer 9. Thus, the top surface 2T of the element body 2 is separated into the upper surface M1 and the lower surface M2. The edge EU of the base layer 7 is situated on the upper surface M1, and the edge EM of the plating layer 9 is situated on the lower surface M2. The step 8 extends in a direction vertical to the top surface 2T in the illustrated embodiment. It should be noted, however, that the vertical step 8 may be replaced with an inclined surface. The height H of the step 8 is preferably between 0.5 μm and 2.0 μm. If the height H of the step 8 is equal to or greater than 0.5 μm, it is possible to disperse the stress applied to the element body 2 via the external electrodes 6A and 6B in an effective manner. If the height H of the step 8 is equal to or smaller than 2.0 μm, a reduction in the thickness of the element body 2 between the external electrodes 6A and 6B can be suppressed. This suppresses a decrease in the flexural strength of the multilayer ceramic capacitor 1.

The step 8 may be formed to extend around the element body 2 along the edge of the base layer 7 of each of the external electrodes 6A and 6B. In this configuration, the step 8 is formed on the top surface 2T, rear surface 2R, bottom surface 2W and front surface 2F of the element body 2 for each of the external electrodes 6A and 6B. The step 8 stands vertically on each of the top surface 2T, rear surface 2R, bottom surface 2W and front surface 2F of the element body 2. In other words, the upper cover layer 5B has the steps 8, the rear margin portion 10 has the steps 8, the lower cover layer 5A has the steps 8 and the front margin portion 10 has the steps 8. The thickness (height) of the element body 2 at the position covered by the base layer 7 (i.e., the thickness between the lower surface M3 and the upper surface M1) is thicker than the thickness of the element body 2 at the position exposed from the base layer 7 (i.e., the thickness between the lower surface M4 and the upper surface M2). The thickness of the element body 2 is a value (size) in the height direction DH of the element body 2, and is measured at points on the respective surfaces M1-M3, M2-M4 within 20 μm from the step 8. For example, the thickness of the element body 2 at the position covered by the base layer 7 is measured from a certain point on the lower surface M3 and a certain point on the upper surface M1, and the distance from each of the points to the step 8 is within 20 μm. The width of the element body 2 at the position covered by the base layer 7 may be wider than the width of the element body 2 at the position exposed from the base layer 7. The width of the element body 2 is a value in the width direction DW of the element body 2, and is measured at points on the respective surfaces within 20 μm from the step 8. The thickness of the lower cover layer 5A, the thickness of the upper cover layer 5B, the thickness of the front margin portion 10 and/or the thickness of the rear margin portion 10 may be adjusted such that the inner electrode layers 3A and 3B are not exposed from the element body 2 that has the steps 8.

Although the dimensions (size) of the multilayer ceramic capacitor 1 are not limited to particular values, the following design values may be used, for example:

0.25 mm in length, 0.125 mm in width, and 0.125 mm in height (0201 size),
0.4 mm in length, 0.2 mm in width, and 0.2 mm in height (0402 size),
0.6 mm in length, 0.3 mm in width, and 0.3 mm in height (0603 size),
1.0 mm in length, 0.5 mm in width, and 0.5 mm in height (1005 size),
3.2 mm in length, 1.6 mm in width, and 1.6 mm in height (3216 size),
4.5 mm in length, 3.2 mm in width, and 2.5 mm in height (4532 size) or
5.7 mm in length, 5.0 mm in width, and 2.3 mm in height (5750 size).

Preferably one of "0201 size" to "4532 size" may be used.

Figure 3B:
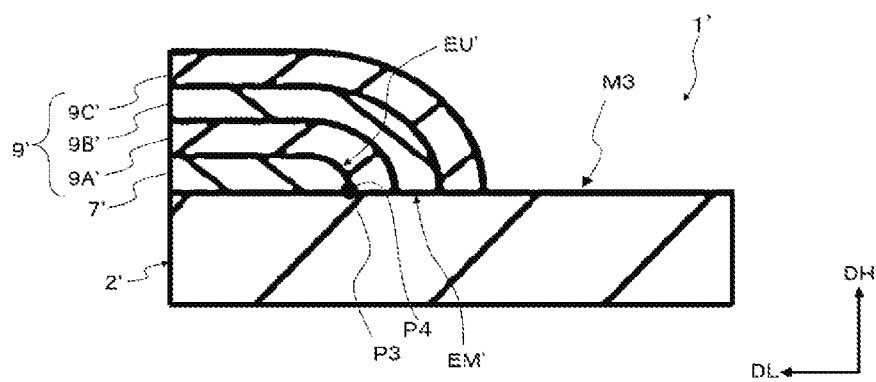
FIG. 3B is similar to FIG. 3A and shows the stress loading points when there is no step on the surface of the element body.

FIG. 3A is a partial cross-sectional view of the capacitor 1 and shows the stress loading points P1 and P2 when the element body 2 has the steps 8. FIG. 3B is a partial cross-sectional view of a different capacitor 1' that includes an element body 2', a base layer 7' formed on the element body 2', and the plating layer 9' formed on the base layer 7'. The element body 2' does not have the step 8. The plating layer 9' has a three-layer structure, and includes a Cu plating layer 9A', an Ni plating layer 9B' and an Sn plating layer 9C'. FIG. 3B shows stress loading points P3 and P4 when the element body 2' does not have the step 8.

As shown in FIG. 3A, when the element body 2 has the step 8 at the edge of the base layer 7, the edge EU of the base layer 7 is located on the upper surface M1, and the edge EM of the plating layer 9 is located on the lower surface M2. Thus, the stress loading point P1 from the base layer 7 and the stress loading point P2 from the plating layer 9 are not located on the same plane of the element body 2. As a result, it is possible to avoid the concentration of the two stresses (i.e., the stress applied to the element body 2 through the base layer 7 and the stress applied to the element body 2 through the plating layer 9). Accordingly, possibility of cracking in the element body 2 can be reduced or eliminated.

In the configuration shown in FIG. 3B, on the other hand, an edge EU' of the base layer 7' and an edge EM' of the plating layer 9' are present on the same surface M3 of the element body 2'. Therefore, the stress loading point P3 from the base layer 7' and the stress loading point P4 from the plating layer 9' exist on the same plane M3 of the element body 2'. More specifically, the stress loading point P3 substantially overlaps the stress loading point P4. As a result, the stresses applied to the element body 2' through the base layer 7' and the stresses applied to the element body 2' through the plating layer 9' are concentrated, and cracking is more likely to occur in the element body 2'.

Figure 4A:
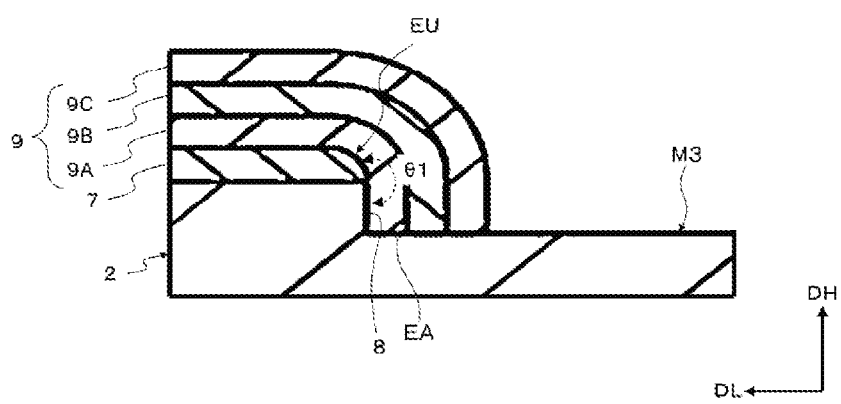
FIG. 4A is the same cross-sectional view as FIG. 3A and shows a wrap-around angle of an end portion of a plating layer over a base layer and the step of the element body.
Figure 4B:
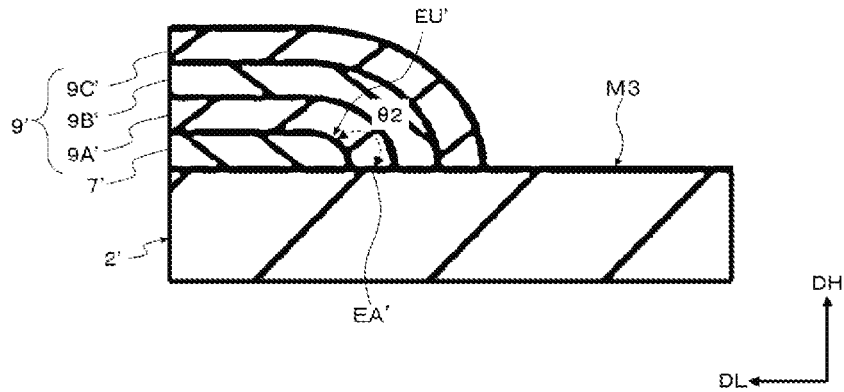
FIG. 4B is the same cross-sectional view as FIG. 3B and shows a wrap-around angle of the end portion of the plating layer over the base layer.

FIG. 4A is the same cross-sectional view as FIG. 3A and shows a wrap-around angle θ1 of the end portion of the plating layer 9 when the element body 2 has the step 8. FIG. 4B is the same cross-sectional view as FIG. 3B and shows a wrap-around angle θ2 of the end portion of the plating layer 9' when the element body 2' has no step.

In FIG. 4A, the element body 2 has the vertical step 8 at the edge EU of the base layer 7 and the step 8 is covered with the Cu plating layer 9A. The Cu plating layer 9A goes around the step 8 and reaches the surface M3 of the element body 2. The edge EU of the base layer 7 may be in the form of an acute angle. The wrap-around angle θ1 of the Cu plating layer 9A from the edge EU of the base layer 7 to the surface M3 of the element body 2 is between 180 degrees and 270 degrees.

On the other hand, in FIG. 4B, there is no step 8 in the element body 2' at the edge EU' of the base layer 7'. The Cu plating 9A' extends over the base layer 7' and reaches the surface M3 of the element body 2'. The end face EU' of the base layer 7' and the end face EA' of the Cu plating layer 9A' are present on the same plane. Therefore, the wrap-around angle θ2 of the Cu plating layer 9A' from the edge EU' of the base layer 7' to the surface M3 of the element body 2' is less than 180 degrees.

Figure 5:
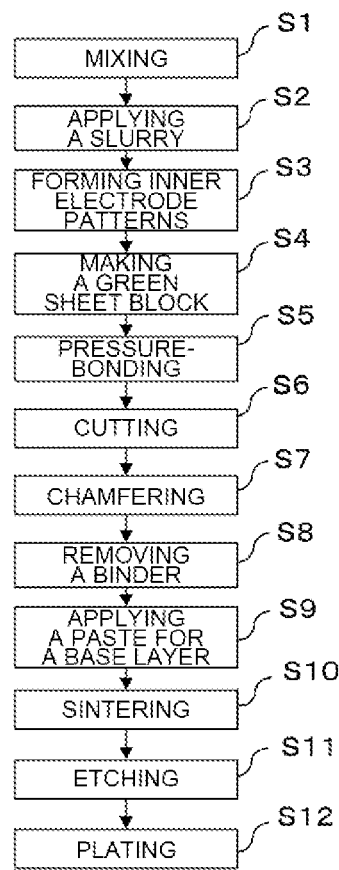
FIG. 5 is a flowchart showing a method of manufacturing the multilayer ceramic capacitor shown in FIG. 1.

FIG. 5 is a flowchart showing an exemplary manufacturing method for the multilayer ceramic capacitor 1, and FIGS. 6A to 6J are a series of cross-sectional views that correspond to the respective manufacturing processes shown in FIG. 5. In FIG. 6C to FIG. 6J, it should be noted that for the sake of description and understanding, three internal electrode layers 3A and three internal electrode layers 3B are alternately stacked, with the dielectric layers 4 being interposed between the internal electrode layers 3A and 3B.

As indicated in Step S1 of FIG. 5, an organic binder and an organic solvent as a dispersant and a forming aid are added to a dielectric material powder, and pulverized and mixed to produce a muddy slurry. The dielectric material powder includes, for example, a ceramic powder. The dielectric material powder may contain an additive or additives. The additive(s) may be, for example, an oxide of Mg, Mn, V, Cr, Y, Sm, Eu, Gd, Tb, Dy, Ho, Er, Tm, Yb, Co, Ni, Li, B, Na, K or Si, or glass. The organic binder is, for example, polyvinyl butyral resin or polyvinyl acetal resin. The organic solvent is, for example, ethanol or toluene.

Figure 6A:
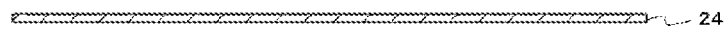
FIG. 6A is a cross-sectional view useful to describe the manufacturing method of the multilayer ceramic capacitor shown in FIG. 1.

Next, as indicated in Step S2 of FIG. 5 and shown in FIG. 6A, a green sheet 24 is prepared. Specifically, the slurry containing the ceramic powder is applied onto a carrier film in a sheet form and dried to manufacture the green sheet 24. The carrier film is, for example, a PET (polyethylene terephthalate) film. A doctor blade method, a die coater method or a gravure coater method may be used to apply the slurry onto the carrier film. Step S2 is repeated to prepare a plurality of green sheets 24.

Figure 6B:
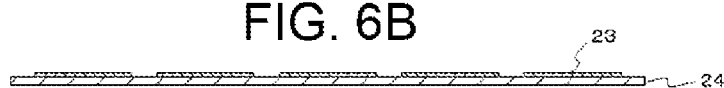
FIG. 6B is another cross-sectional view useful to describe the manufacturing method of the multilayer ceramic capacitor shown in FIG. 1.

Next, as described in Step S3 of FIG. 5 and shown in FIG. 6B, a conductive paste, which will become the internal electrode, is applied in a predetermined pattern onto each of those green sheets 24, which will form the internal electrode layers 3A and 3B, among the green sheets prepared in Step S1 to form a plurality of internal electrode patterns 23 on that green sheet 24. In Step 3, it is possible to form a plurality of internal electrode patterns 23 on the single green sheet 24 such that the internal electrode patterns 23 are separated from each other in the longitudinal direction of the green sheet 24. The conductive paste for the internal electrode includes a powder of the metal used as the material of the internal electrode layers 3A and 3B. For example, if the metal used as the material of the internal electrode layers 3A and 3B is Ni, the conductive paste for the internal electrodes contains a Ni powder. Further, the conductive paste for the internal electrodes includes a binder, a solvent, and, if necessary, an auxiliary agent. The conductive paste for the internal electrodes may contain, as a co-material, a ceramic material which is the main component of the dielectric layers 4. The application of the conductive paste for the internal electrodes may be carried out by a screen printing method, an ink jet printing method or a gravure printing method. Thus, Step S3 may be referred to as a printing step. In this manner, a plurality of green sheets 24 that have the inner electrode patterns 23 thereon are prepared.

Figure 6C:
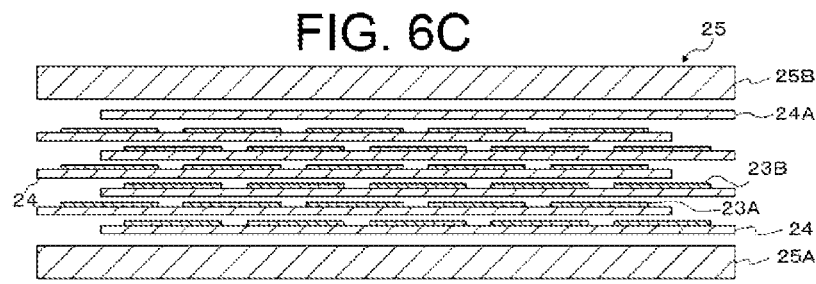
FIG. 6C is still another cross-sectional view useful to describe the manufacturing method of the multilayer ceramic capacitor shown in FIG. 1.

Next, as described in Step S4 of FIG. 5 and shown in FIG. 6C, the green sheets 24 on which the internal electrode patterns 23 are formed and the green sheets 24A, 25A and 25B on which the internal electrode patterns 23 are not formed are laminated in a predetermined order to create a block 25 of the green sheets 24. The green sheets 25A and 25B on which the internal electrode patterns 23 are not formed are used as outer layers (i.e., the bottom layer and the top layer). The thickness of the green sheet 25A, 25B is greater than the thickness of the green sheet 24 on which the internal electrode patterns 23 are formed. In Step S4, the green sheets 24 having the internal electrode patterns 23 thereon are divided into two groups, i.e., the green sheets 24 having the internal electrode patterns 23A thereon and the green sheets 24 having the internal electrode patterns 23B thereon. Then, the green sheets 24 having the internal electrode patterns 23A thereon and the green sheets 24 having the internal electrode patterns 23B thereon are stacked alternately in the laminating direction such that the internal electrode patterns 23A on the green sheet 24 and the internal electrode patterns 23B on the next or adjacent green sheet 24 are alternately shifted in the longitudinal direction of the green sheet 24. Further, three types of portions are defined in the green sheet block 25. Specifically, a portion where only the internal electrode patterns 23A are stacked in the stacking direction, a portion where the internal electrode patterns 23A and 23B are stacked alternately in the stacking direction, and a portion where only the internal electrode patterns 23B are stacked in the stacking direction are defined the green sheet block 25.

Figure 6D:
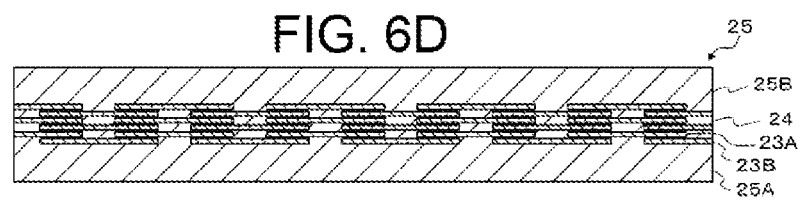
FIG. 6D is yet another cross-sectional view useful to describe the manufacturing method of the multilayer ceramic capacitor shown in FIG. 1.

Next, as described in Step S5 of FIG. 5 and shown in FIG. 6D, the laminate block 25 obtained in the forming process of Step S4 of FIG. 5 is pressed such that the green sheets 24, 24A, 25A and 25B are pressure-bonded. Pressing the laminate block 25 may be carried out by, for example, sandwiching the laminate block 25 between resin films, and hydrostatically pressing the laminate block 25.

Figure 6E:
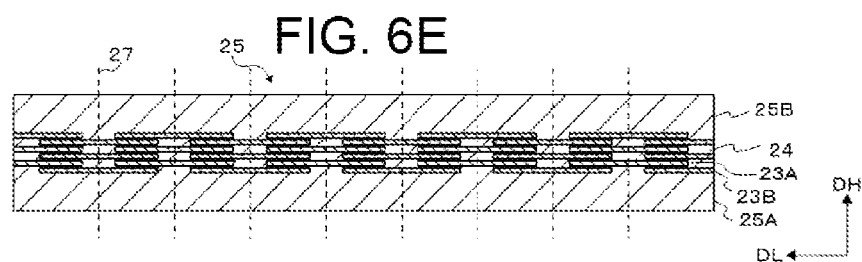
FIG. 6E is another cross-sectional view useful to describe the manufacturing method of the multilayer ceramic capacitor shown in FIG. 1.

Next, as described in Step S6 of FIG. 5 and shown in FIG. 6E, the pressed laminate block 25 is cut such that the block 25 is separated to a plurality of element bodies, each of which has a rectangular parallelepiped shape. Each element body has six surfaces. The cutting of the laminate block 25 is carried out at the portions where only the inner electrode patterns 23A are present in the stacking direction, and the portions where only the inner electrode patterns 23B are present in the stacking direction, as indicated by a plurality of vertical broken lines 27. The cutting of the laminate block 25 is carried out by, for example, blade dicing or a similar method. One of the resulting element bodies 2B is shown in FIG. 6F.

Figure 6F:
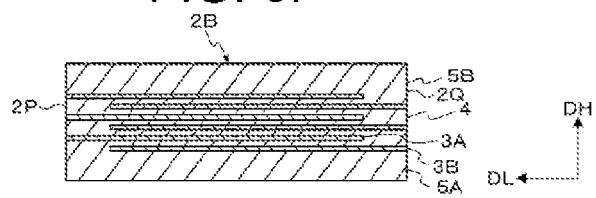
FIG. 6F shows another cross-sectional view useful to describe the manufacturing method of the multilayer ceramic capacitor shown in FIG. 1.

As shown in FIG. 6F, the internal electrode layers 3A and 3B are alternately laminated via the dielectric layers 4 in each of the individual element bodies 2B, with the upper cover layer 5A becoming the top layer and the lower cover layer 5B becoming the bottom layer. The internal electrode layers 3A are exposed on the left face 2P of each element body 2B, and the internal electrode layers 3B are exposed on the right face 2Q of each element body 2B. It should be noted that in FIG. 6F the element body 2B is shown enlarged in the length direction DL.

Figure 6G:
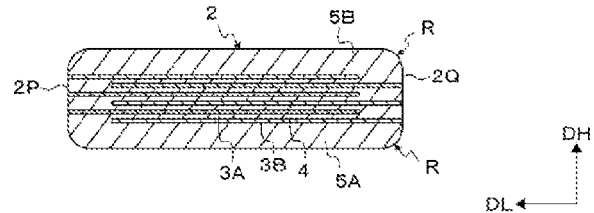
FIG. 6G shows another cross-sectional view useful to describe the manufacturing method of the multilayer ceramic capacitor shown in FIG. 1.

Next, as described in Step S7 of FIG. 5 and shown in FIG. 6G, chamfering is performed to the element body 2B to form an element body 2 that has curved surfaces R at the respective corners of the element body 2. For example, barrel polishing may be used to chamfer the element body 2B.

Next, as indicated in Step S8 of FIG. 5, the binder contained in the element body 2 in Step S7 of FIG. 5 is removed. The removal of the binder is carried out by, for example, heating the element body 2 in an N2 atmosphere at about 350 degrees C.

Next, as indicated Step S9 of FIG. 5, a conductive paste for the base layer (underlayer) 7 is applied to the two side surfaces 2P and 2Q of each element body 2 which has undergone the chamfering in Step S8 of FIG. 5 and to the end areas of the remaining four surfaces (top surface 2T, the bottom surface 2W, the front surface 2F and the rear surface 2R) of the element body 2 which are in contact with the respective side surfaces 2P and 2Q. Then, the conductive paste is dried. A dipping method may be used to apply the conductive paste for the base layer 7. The conductive paste for the base layer 7 includes a powder or filler of the metal used as the conductive material of the base layer 7. For example, when the metal used as the conductive material of the base layer 7 is Ni, the conductive paste for the base layer includes a powder or filler of Ni. Further, the conductive paste for the base layer includes, as a co-material, a ceramic component, which is the main component of the dielectric layers 4, for example. Particles of oxide ceramics mainly composed of barium titanate (0.8 μm to 4 μm in D50 particle diameter), for example, are mixed in the conductive paste for the base layer, as the co-material. Further, the conductive paste for the base layer includes a binder and a solvent.

Figure 6H:
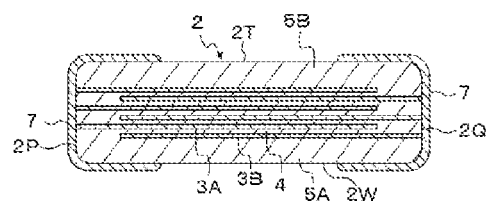
FIG. 6H is another cross-sectional view useful to describe the manufacturing method of the multilayer ceramic capacitor shown in FIG. 1.

Next, as described in Step S10 of FIG. 5 and shown in FIG. 6H, the element bodies 2, on which the conductive paste for the base layer is applied in Step S9 of FIG. 5, undergo a sintering process such that the inner electrode layers 3A and 3B are integrated with the dielectric layers 4 in each element body 2 and the base layers 7 are formed and integrated with the element body 2. The sintering of the element bodies 2 and the conductive paste for the base layers is carried out in, for example, a sintering furnace in a temperature range from 1000 degrees C. to 1400 degrees C. for ten minutes to two hours. If a base metal such as Ni or Cu is used as the material of the internal electrode layers 3A and 3B, the sintering process may be carried out in the sintering furnace while the interior of the sintering furnace is kept to a reducing atmosphere in order to prevent the oxidation of the internal electrode layers 3A and 3B. In the process of forming the base layers 7, oxidation treatment may additionally be applied to the element bodies 2 in an N2 gas atmosphere at a temperature of 600 degrees C. to 1000 degrees C.

Figure 6I:
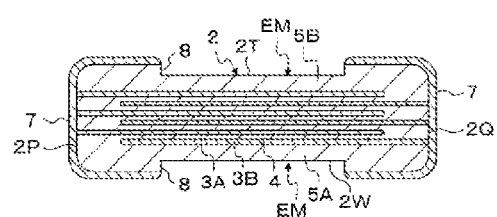
FIG. 6I is another cross-sectional view useful to describe the manufacturing method of the multilayer ceramic capacitor shown in FIG. 1.
Figure 6J:
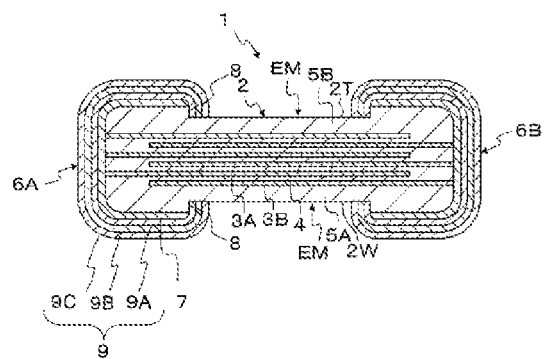
FIG. 6J is another cross-sectional view useful to describe the manufacturing method of the multilayer ceramic capacitor shown in FIG. 1.

Next, as described in Step S11 of FIG. 5 and shown in FIG. 6I, an etching process is applied to the element bodies 2 such that the surfaces of each of the element bodies 2 exposed from the right and left base layers 7 are etched to form the right and left steps 8 on the element body 2 along the edges of the right and left base layers 7. An etched surface EM is formed on each of the bottom surface 2W, the top surface 2T, the front surface 2F and the rear surface 2R of the element body 2. The left and right steps 8 extend around the element body 2 and are associated with the left and right external electrodes 6A and 6B, respectively.

The etching process applied to the element bodies 2 may be wet etching or dry etching. The etching process may be performed with hydrofluoric acid etchant or etching gas. By adjusting the etching time, the etching temperature, the etching speed, how many element bodies 2 are etched, and the agitation speed of the etchant, it is possible to perform the etching process in a desired manner (e.g., it is possible to decide the depth of the etched surfaces EM).

Subsequent to Step S11 (FIG. 6I), a plating process is carried out. Specifically, as indicated in Step S12 of FIG. 5 and shown in FIG. 6J, a plating layer 9 is formed on each of the base layers 7. In the process of forming the plating layer 9, a Cu plating layer 9A, an Ni plating layer 9B and an Sn plating layer 9C are sequentially formed on the base layer 7. The edge (end face) of the Cu plating layer 9A, the edge of the Ni plating layer 9B and the edge of the Sn plating layer 9C are in contact with the etched surface EM of element body 2. In the plating process, the element body 2 on which the base layers 7 are formed is placed in a barrel together with the plating solution, and the electricity is supplied to the barrel while rotating the barrel, so as to form the plating layers 9.

In the etching process to form the steps 8 on the element body 2, the metal oxide film and the co-material are removed from the surface of each of the base layers 7. Therefore, it is possible to form the steps 8 on the element body 2 while suppressing the increase in the number of manufacturing processes, and it is also possible to improve the adhesion of the Cu plating layer 9A to the base layer 7.

Second Embodiment

Figure 7:
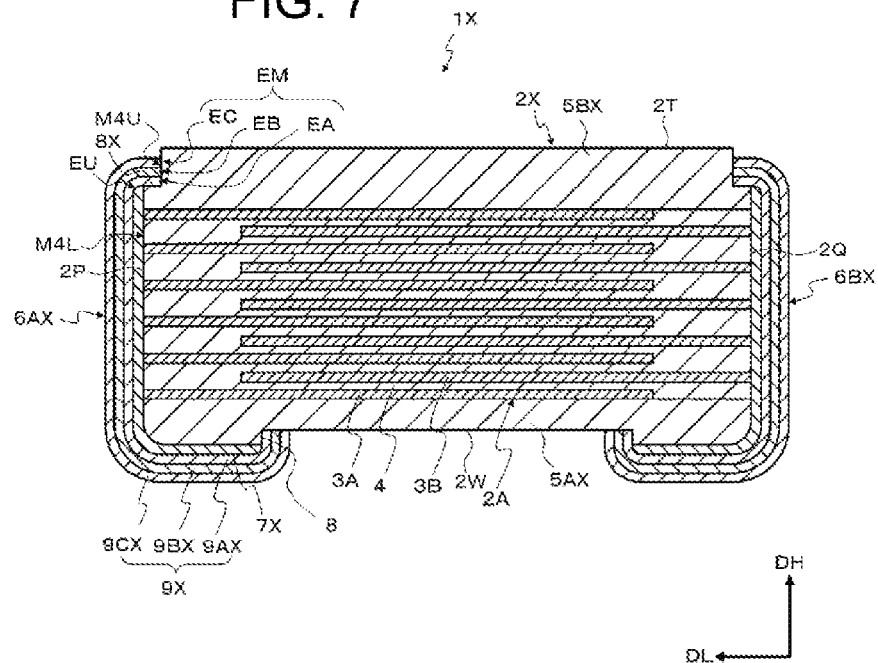
FIG. 7 shows a cross-sectional view of a multilayer ceramic capacitor according to a second embodiment of the present invention.

A second embodiment of the invention will be described with reference to FIG. 7. FIG. 7 is a cross-sectional view of a multilayer ceramic capacitor 1X according to the second embodiment. Similar or same reference numerals and signs are used to designate similar or same parts and elements in the first and second embodiments.

As shown in FIG. 7, the multilayer ceramic capacitor 1X has an element body 2X and external electrodes 6AX and 6BX. The element body 2X includes a laminate 2A, a lower cover layer 5AX and an upper cover layer 5BX. The laminate 2A has internal electrode layers 3A and 3B and dielectric layers 4. The lower cover layer 5AX is provided under the laminate 2A, and the upper cover layer 5BX is provided on top of the laminate 2A. The configuration of the laminate 2A is the same as that shown in FIG. 2.

The external electrodes 6AX and 6BX are formed on the element body 2X such that the external electrode 6BX is separated from the external electrode 6AX in the length direction DL. The left external electrode 6AX upward extends from the left end area of the bottom surface 2W of the element body 2X and lies over the left face 2P of the element body 2X. The right external electrode 6AB extends upward from the right end area of the bottom surface 2W of the element body 2X and lies over the right face 2Q of the element body 2X. The external electrodes 6AX and 6BX do not extend over the top surface 2T of the element body 2X. The top edge (upper end) of each of the external electrodes 6AX and 6BX is lower than the top surface 2T of the element body 2X.

The external electrodes 6AX and 6BX may also be formed on the front surface 2F and the rear surface 2R of the element body 2X. Alternatively, the external electrodes 6AX and 6BX may not be formed on the front surface 2F and the rear surface 2R of the element body 2X. When the external electrodes 6AX and 6BX are formed on the front surface 2F and rear surface 2R of the element body 2X, the upper end of each of the external electrodes 6AX and 6BX is lower position than the top surface 2T of the element body 2X.

Each of the external electrodes 6AX and 6BX has a base layer 7X formed on the element body 2X and a plating layer 9X formed on the base layer 7X. The left base layer 7A is formed on the left face 2P of the element body 2X, and the right base layer 7X is formed on the right face 2Q of the element body 2X. The left base layer 7X is separated from the right base layer 7X in the length direction DL of the element body 2X. The left base layer 7X is connected to the internal electrode layers 3A and the right base layer 7X is connected to the internal electrode layers 3B. The left base layer 7X is formed on the left face 2P of the element body 2X and also on an adjacent area of one or three of the front surface 2F, rear surface 2R and bottom surface 2W of the element body 2X. The base layer 7X is not formed on the top surface 2T of the element body 2X. The right base layer 7X is formed on the right face 2Q of the element body 2X and also on adjacent area of one or three of the front surface 2F, rear surface 2R and bottom surface 2W of the element body 2X. The right base layer 7X is not formed on the top surface 2T of the element body 2X. Thus, the base layer 7X may extend from the end area of the bottom surface 2W to the side face 2P, 2Q of the element body 2X, and also to the front surface 2F and rear surface 2R of the element body 2X. As shown in FIG. 7, the upper edge of the base layer 7X on the side face 2p, 2Q of the element body 2X is lower than the upper surface 2T of the element body 2X. It should be noted, however, that the upper edge of the left base layer 7X on the left face 2P of the element body 2X is higher than the internal electrode layers 3A and the upper edge of the right base layer 7X on the right face 2Q of the element body 2X is higher than the internal electrode layers 3B.

The left and right plating layers 9X are formed for the left and right external electrodes 6AX and 6BX to cover the left and right base layers 7X, respectively. The left plating layer 9X is electrically connected to the inner electrode layers 3A through the left base layer 7X, and the right plating layer 9X is electrically connected to the inner electrode layers 3B through the right base layer 7X. Each of the plating layers 9X may have a three-layer structure. Specifically, the plating layer 9X may include the Cu plating layer 9AX formed on the base layer 7X, the Ni plating layer 9BX formed on the Cu plating layer 9AX, and the Sn plating layer 9CX formed on the Ni plating layer 9BX.

The structure of the upper portions of the external electrodes 6AX and 6BX is different from the structure of those in the first embodiment (FIG. 2). Also, the structure of the upper portion of the element body 2X is different from the structure of that in the first embodiment.

The following will describe the differences between the element body 2X and the element body 2 (FIG. 2), and the differences between the external electrodes 6AX, 6BX and the external electrodes 6A, 6B (FIG. 2).

As shown in FIG. 7, the position of the upper end face (edge) EU of the base layer 7X is different from the position of the upper end face (edge) EM of the plating layer 9X in the direction normal to the side face 2P of the element body 2X (i.e., in the length direction DL). In other words, the position of the upper edge EU of the base layer 7X is different from the position of the upper end face EA of the Cu plating layer 9AX, the position of the upper end face EB of the Ni plating layer 9BX and the position of the upper end face EC of the Sn plating layer 9CX in the length direction DL. If the external electrodes 6AX and 6BX also extend onto the front surface 2F and the rear surface 2R of the element body 2X, the position of the edge EU of the base layer 7X on the front surface 2F may be different from the position of the edge EM of the plating layer 9X on the front surface 2F in the direction normal to the front surface 2F (in the width direction DW) and the position of the edge EU of the base layer 7X on the rear surface 2R may be different from the position of the edge EM of the plating layer 9X on the rear surface 2R in the direction normal to the rear surface 2R (in the width direction DW). The "edge" is the end of the respective layer.

In order to cause the edge EU of the base layer 7X to shift from the edge EM of the plating layer 9X in the length direction DL of the element body 2X, a step 8X is provided on the left face 2P of the element body 2X. A similar step 8X is also provided on the right face 2Q of the element body 2X for the same reason. The step 8X extends horizontally between the edge EU of the base layer 7X and the edge EM of the plating layer 9X, and separates the side face 2P, 2Q of the element body 2X into an upper portion (upper side face) M4U and a lower portion (lower side face) M4L. The edge EU of the base layer 7X resides on the lower side face M4L, and the edge EM of the plating layer 9X resides on the upper side face M4U. Instead of the horizontal step 8X, an inclined surface may be provided between the lower side face M4L and the upper side face M4U.

As shown in FIG. 7, the shape of the upper cover layer 5BX of the element body 2X is different from the shape of the upper cover layer 5B of the first embodiment. The upper cover layer 5BX has the step 8X along the edge EU of the base layer 7X of each of the external electrodes 6AX and 6BX. Specifically, the left side face M4U of the upper cover layer 5BX has the left step 8X and the right side face M4U of the upper cover layer 5BX has the right step 8X. In this configuration, the element body 2X has the two steps 8X. If the external electrodes 6AX and 6BX also extend onto the front and rear surfaces of the upper cover layer 5BX, the front surface may have the step 8X that extends forward in the width direction DW of the element body 2X, and the rear surface may have the step 8X that extends backward in the width direction DW of the element body 2X. In this configuration, the element body 2X has the four steps 8X. In either configuration, the edges EM of the plating layers 9X and the edges EU of the base layers 7X are present on the element body 2X, and the edges EM of the plating layers 9X are closer to the center of the element body 2X than the edges EU of the base layers 7X when viewed from the above.

It should be noted that the lower cover layer 5AX of this embodiment is similar to the lower cover layer 5A of the first embodiment, and the lower cover layer 5AX has the steps 8 that are similar to the steps 8 shown in FIG. 2. Since the element body 2X of this embodiment has the steps 8 and 8X, the stresses applied from the external electrodes 6AX and 6BX to the bottom face 2W and the side faces 2P and 2Q of the element body 2X are reduced. It is also possible to reduce the height of the multilayer ceramic capacitor 1X. In addition, since the upper ends of the external electrodes 6AX and 6BX are located on the side faces 2P and 2Q of the element body 2X (i.e., the surfaces on which the internal electrodes 3A and 3B are exposed or the draw-out surfaces of the internal electrodes 3A and 3B), it is possible to reduce the stresses at locations close to the capacitance generation area where the internal electrodes 3A and 3B face each other. This prevents the racking of the element body 2X. The end EM of each of the plating layers 9X and the end EU of each of the base layers 7X are present on the element body 2X, and the end EM of the plating layer 9X is closer to the center of the element body than the end EU of the base layer 7X in the length direction DL.

Third Embodiment

Figure 8:
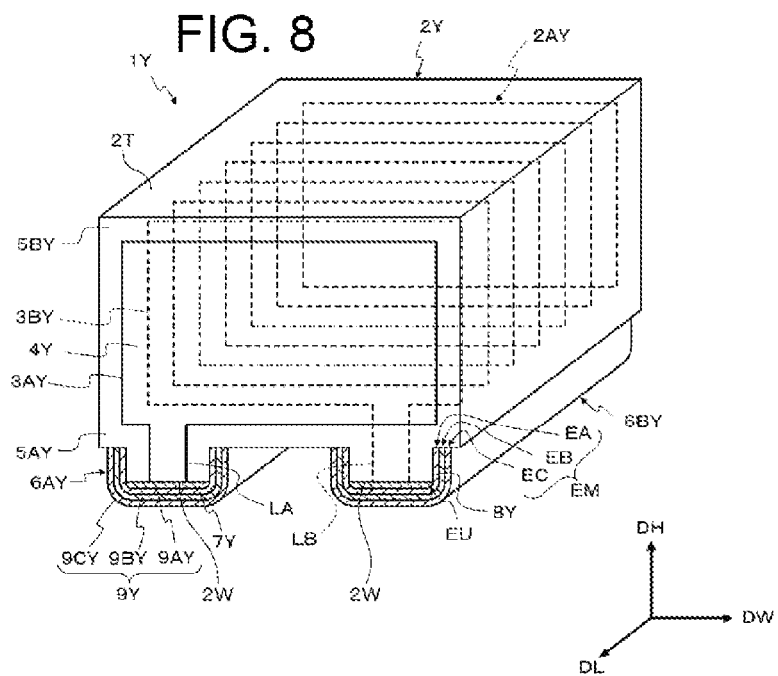
FIG. 8 is a perspective and cross-sectional view of a multilayer ceramic capacitor according to a third embodiment of the present invention.

A third embodiment of the invention will be described with reference to FIG. 8. FIG. 8 is a cross-sectional view of a multilayer ceramic capacitor 1Y according to the third embodiment, cut in the width direction DW of an element body 2Y of the capacitor 1Y.

In FIG. 8, the multilayer ceramic capacitor 1Y has the element body 2Y and external electrodes 6AY and 6BY. The element body 2Y has a laminate 2AY, a lower cover layer 5AY and an upper cover layer 5BY. The laminate 2AY has inner electrode layers 3AY, 3BY and dielectric layers 4Y. The lower cover layer 5AY is provided below the laminate 2AY, and the upper cover layer 5BY is provided on top of the laminate 2AY.

The internal electrode layers 3AY and 3BY are alternately arranged in the longitudinal direction DL of the element body 2Y via the dielectric layers 4Y. Each of the internal electrode layers 3AY and 3BY stands in an upright posture inside the element body 2Y (i.e., extends in the height direction DH of the element body 2Y). A lead electrode LA is connected to a lower end of each of the internal electrode layers 3AY and another lead electrode LB is connected to a lower end of each of the internal electrode layers 3BY. The positions of the lead electrodes LB are shifted from the positions of the lead electrodes LA in the width direction DW of the element body 2Y. The lead electrodes LA and LB are exposed in the bottom face 2W of the element body 2Y. The lead electrodes LA of the internal electrode layers 3AY are aligned with each other in the length direction DL of the element body 2Y, the lead electrodes LB of the internal electrode layers 3BY are aligned with each other in the length direction DL of the element body 2Y. The materials and thicknesses of the internal electrode layers 3AY, 3BY and dielectric layers 4Y are the same as those of FIG. 2. The material of the lower cover layer 5AY and upper cover layer 5BY is the same as the material of the lower cover layer 5A and upper cover layer 5B shown in FIG. 2.

The external electrodes 6AY and 6BY are formed in parallel on the bottom face 2W of the element body 2X, and separated (spaced) from each other in the width direction DW of the element body 2X. Each of the external electrodes 6AY and 6BY includes a base layer 7Y formed on the bottom face 2W of the element body 2Y and a plating layer 9Y formed on the base layer 7Y. The two base layers 7Y are formed in parallel on the bottom face 2W of the element body 2Y such that the two base layers 7Y are separated from each other in the width direction DW, and are connected to the lead electrodes LA and LB, respectively.

The plating layer 9Y is formed for each of the external electrodes 6AY and 6BY to cover the base layer 7Y. The plating layer 9Y is electrically connected with the internal electrode layers 3AY, 3BY through the base layer 7Y. The plating layer 9Y has, for example, a three-layer structure, i.e., a Cu plating layer 9AY formed on the base layer 7Y, an Ni plating layer 9BY formed on the Cu plating layer 9AY, and an Sn plating layer 9CY formed on the Ni plating layer 9BY.

Each of the two base layers 7Y has two edges EU extending in parallel in the length direction DL of the element body 2Y. Each of the two plating layers 9Y has two edges EM extending in parallel in the length direction DL of the element body 2Y. For each of the base layers 7Y, the edges EU of the base layer 7Y and the edges EM of the plating layer 9Y have different positions in the normal direction of the bottom surface 2W of the element body 2Y (in the height direction DH). The positions of the edges EA of the Cu plating layer 9AY, the positions of the edges EB of the Ni plating layer 9BY and the positions of the edges EC of the Sn plating layer 9CY are different from the positions of the edges EU of the base layer 7Y in the width direction DW of the element body 2Y. The "edge" is the end face of the respective layer. The edges EM of the plating layer 9Y and the edges EU of the base layer 7Y are present on the element body 2Y. The edges EM of the plating layer 9Y are closer to the center of the element body 2 than the edges EU of the base layer 7Y in the height direction DH.

Since the height position of the edges EU of the base layer 7Y is different the height position of the edges EM of the plating layer 9Y, a step 8Y is formed on the bottom face 2W of the element body 2Y for each edge EU of the base layer 7Y. The step 8Y extends vertically between the edge EU of the base layer 7Y and the edge EM of the plating layer 9Y. Instead of the vertical step 8Y, an inclined surface may be provided on the bottom face 2W of the element body 2Y.

Since the element body 2Y has the two steps 8Y for each of the two external electrodes 6AY and 6BY, it is possible to reduce the stresses applied to the bottom face 2W of the element body 2Y from the external electrodes 6AY and 6BY. It is also possible to reduce the height of the multilayer ceramic capacitor 1Y. In addition, since the ends of the external electrodes 6AY and 6BY are located on the surface that exposes the lead electrodes LA and LB, it is possible to reduce the stresses generated at the positions close to the capacitance generation area where the internal electrodes 3AY and 3BY face each other. This prevents the cracking in the element body 2Y.

Fourth Embodiment

A fourth embodiment of the present invention will be described with reference to FIG. 9. In this embodiment, the multilayer ceramic capacitor 1 of the first embodiment is used. FIG. 9 is a cross-sectional view of a device (circuit board arrangement) 40 that has a circuit board 11 and the multilayer ceramic capacitor 1 mounted on the circuit board 11.

In FIG. 9, land electrodes 12A and 12B are provided on the circuit board 11. The circuit board 11 may be a printed circuit board or a semiconductor substrate made from, for example, Si. The multilayer ceramic capacitor 1 is connected to the land electrodes 12A and 12B via the respective solder layers 13A and 13B attached to the Sn plating layers 9C of the external electrode 6A and 6B.

Since the element body 2 has the steps 8 at the edges UE of the base layers 7, the stress loading points from the base layers 7 and the stress loading points from the plating layers 9 are not present on the same plane of the element body 2. Therefore, even when the stresses are applied to the external electrodes 6A and 6B due to the bending or expansion of the circuit board 11, the stresses are dispersed (the stresses are not concentrated) and applied to the element body 2 via the external electrodes 6A and 6B, and the cracking in the element body 2 can be suppressed.

Fifth Embodiment

Figure 10:
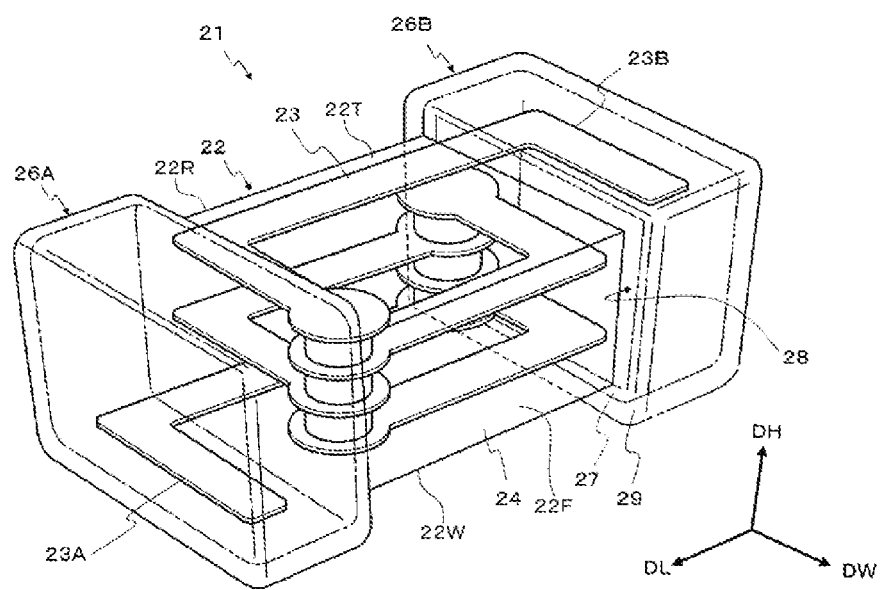
FIG. 10 is a perspective view of a ceramic electronic component according to a fifth embodiment of the present invention.

A fifth embodiment of the invention will be described with reference to FIG. 10. FIG. 10 shows a perspective view of a ceramic electronic component 21 according to the fifth embodiment. In this embodiment, a chip inductor 21 is used as an example as a ceramic electronic component.

In FIG. 10, the chip inductor 21 includes an element body 22 and external electrodes 26A and 26B. The element body 22 has a coil pattern 23, internal electrode layers 23A, 23B and a magnetic material 24. The magnetic material 24 serves as a dielectric to insulate the inner electrode layers 23A and 23B. The shape of the element body 22 may be rectangular parallelepiped, and may have a top surface 22T, a bottom surface 22W, a front surface 22F, a rear surface 22R, a left surface and a right surface. The left surface and the right surface of the element body 22 may be referred to as opposite side faces of the element body 22. The external electrodes 26A and 26B are provided on the opposite side faces of the element body 22 and separated from each other in the length direction DL of the element body 22. Specifically, the external electrode 26A is formed on the left surface of the element body 22 and extends to neighboring areas on the front and rear surfaces 22F and 22R of the element body 22 and to neighboring areas on the top and bottom surfaces 22T and 22W of the element body 22. The external electrode 26B is formed on the right surface of the element body 22 and extends to neighboring areas on the front and rear surfaces 22F and 22R of the element body 22 and to neighboring areas on the top and bottom surfaces 22T and 22W of the element body 22.

The coil pattern 23 and the internal electrode layers 23A, 23B are covered with the magnetic material 24. It should be noted, however, that the end of the inner electrode layer 23A is exposed from the magnetic material 24 on the left side face of the element body 22 and is connected to the external electrode 26A, and the end of the internal electrode layer 23B is exposed from the magnetic material 24 on the right side face of the element body 22 and is connected to the external electrode 26B.

The material of the coil pattern 23 and the inner electrode layers 23A, 23B may be, for example, Cu, Fe, Zn, Al, Sn, Ni, Ti, Ag, Au, Pt, Pd, Ta or W, or may be an alloy containing these metals. The magnetic material 24 is, for example, ferrite.

Each of the external electrodes 26A and 26B has a base layer 27 formed on the element body 22 and a plating layer 29 formed on the base layer 27. The base layers 27 are formed on the opposite sides of the element body 22 such that the base layers 27 are separated from each other in the length direction DL of the element body 22. The left base layer 27 extends from the bottom surface 22W of the element body 22 to the top surface 22T over the left surface of the element body 22. The left base layer 27 may also extend onto the front surface 22F and/or the rear surface 22R of the element body 22. The right base layer 27 extends from the bottom surface 22W of the element body 22 to the top surface 22T over the right surface of the element body 22. The right base layer 27 may also extend onto the front surface 22F and/or the rear surface 22R of the element body 22. The plating layer 29 is formed for each of the external electrodes 26A and 26B such that the plating layer 29 covers the base layer 27. The left plating layer 29 is electrically connected to the inner electrode layer 23A via the left base layer 27, and the right plating layer 29 is electrically connected to the inner electrode layer 23B via the right base layer 27. An edge of each of the base layers 27 extends around the element body 22.

The element body 22 has a step 28 for each of the external electrodes 26A and 26B. The left step 28 extends around the element body 22 along the edge of the base layer 27 of the external electrode 26A. The right step 28 extends around the element body 22 along the edge of the base layer 27 of the external electrode 26B. The edge of each of the base layers 27 is separated from the edge of the plating layer 29 by the step 28.

This can avoid an arrangement in which the stress loading point from the base layer 27 and the stress loading point from the plating layer 29 be present on the same plane of the element body 22. As a result, the stresses applied to the element body 22 through the external electrodes 26A and 26B can be dispersed. Consequently, the cracking would hardly occur in the element body 22.

In the above-described embodiments, the multilayer ceramic capacitors and the chip inductor are described as the examples of ceramic electronic components, but the present invention may be applied to other elements and devices such as chip resistors or sensor chips. In the above-described embodiments, the ceramic electronic component has the two external electrodes, but the present invention may be applied to a ceramic electronic component that has three or more external electrodes.

It will be apparent to those skilled in the art that various modifications and variations can be made in the present invention without departing from the spirit or scope of the invention. Thus, it is intended that the present invention encompasses modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A ceramic electronic component comprising:
    an element body having a dielectric, a first internal electrode and a second internal electrode, the element body having a plurality of surfaces including at least one first surface and opposite side surfaces; and
    a first external electrode and a second external electrode formed on the element body,
    the first external electrode including:
    a first base layer formed on the element body such that the first base layer is connected to the first internal electrode and an edge of the first baser layer is present on the at least one first surface of the element body; and
    a first plating layer formed on the first base layer such that an edge of the first plating layer is present on the at least one first surface of the element body at a position different from a position of the edge of the first base layer in a direction perpendicular to the at least one first surface of the element body,
    the second external electrode including:
    a second base layer formed on the element body such that the second base layer is connected to the second internal electrode and an edge of the second baser layer is present on the at least one first surface of the element body; and
    a second plating layer formed on the second base layer such that an edge of the second plating layer is present on the at least one first surface of the element body at a position different from a position of the edge of the second base layer in the direction perpendicular to the at least one first surface of the element body.

2. The ceramic electronic component according to claim 1, wherein the element body has at least one first step or inclined surface on the at least one first surface between the position of the edge of the first base layer and the position of the edge of the first plating layer, and the element body has at least one second step or inclined surface on the at least one first surface between the position of the edge of the second base layer and the position of the edge of the second plating layer.

3. The ceramic electronic component according to claim 1, wherein the first internal electrode is exposed in one of the opposite side surfaces of the element body, the second internal electrode is exposed in the other of the opposite side surfaces of the element body, the first external electrode is formed on the one of the opposite side surfaces and extends onto adjacent areas on other surfaces of the element body including the at least one first surface, and the second external electrode is formed on the other of the opposite side surfaces and extends onto adjacent areas on the other surfaces of the element body including the at least one first surface.

4. The ceramic electronic component according to claim 1, wherein the first internal electrode is exposed in one of the opposite side surfaces of the element body, the second internal electrode is exposed in the other of the opposite side surfaces of the element body, the first external electrode is formed on the one of the opposite side surfaces and extends onto an adjacent area on one of other surfaces of the element body including the at least one first surface, and the second external electrode is formed on the other of the opposite side surfaces and extends onto an adjacent area on the one of the other surfaces of the element body including the at least one first surface.

5. The ceramic electronic component according to claim 1, wherein the first and second internal electrodes are exposed in one of the at least first surface of the element body, and the first and second external electrodes are formed on the one of the at least first surface and spaced from each other.

6. The ceramic electronic component according to claim 1, wherein a thickness of the element body, which is measured in the direction perpendicular to the at least one first surface of the element body, is thicker at a first area covered with the first base layer than at a second area which is not covered with the first base layer, and is thicker at a third area covered with the second base layer than at the second area.

7. The ceramic electronic component according to claim 1, wherein a difference between the position of the edge of the first plating layer and the position of the edge of the first base layer in the direction perpendicular to the at least one first surface of the element body is between 0.5 µm and 2.0 µm, and a difference between the position of the edge of the second plating layer and the position of the edge of the second base layer in the direction perpendicular to the at least one first surface of the element body is between 0.5 µm and 2.0 µm.

8. The ceramic electronic component according to claim 1, wherein the first plating layer has a first sub-layer of plating formed on the first base layer and a second sub-layer of plating formed on the first sub-layer, and the second plating layer has a third sub-layer of plating formed on the second base layer and a fourth sub-layer of plating formed on the third sub-layer, and
 a position of an edge of the first sub-layer and a position of an edge of the second sub-layer are different from the position of the edge of the first base layer in the direction perpendicular to the at least one first surface of the element body, and a position of an edge of the third sub-layer and a position of an edge of the fourth sub-layer are different from the position of the edge of the second base layer in the direction perpendicular to the at least one first surface of the element body.

9. The ceramic electronic component according to claim 8, wherein a wrap-around angle of the first sub-layer from the edge of the first base layer to the at least one first surface of the element body is between 180 degrees and 270 degrees, and a wrap-around angle of the third sub-layer from the edge of the second base layer to the at least one first surface of the element body is between 180 degrees and 270 degrees.

10. The ceramic electronic component according to claim 8, wherein the first plating layer further includes a fifth sub-layer of plating formed on the second sub-layer and the second plating layer further includes a sixth sub-layer of plating formed on the fourth sub-layer, and
 the position of the edge of the first sub-layer, the position of the edge of the second sub-layer and a position of an edge of the fifth sub-layer are different from the position of the edge of the first base layer in the direction perpendicular to the at least one first surface of the element body, and the position of the edge of the third sub-layer, the position of the edge of the fourth sub-layer and a position of an edge of the sixth sub-layer are different from the position of the edge of the second base layer in the direction perpendicular to the at least one first surface of the element body.

11. The ceramic electronic component according to claim 1, wherein each of the first and second plating layers is made from Cu, Fe, Zn, Al, Ni, Pt, Pd, Ag, Au or Sn, or an alloy including at least one of Cu, Fe, Zn, Al, Ni, Pt, Pd, Ag, Au and Sn.

12. The ceramic electronic component according to claim 1, wherein each of the first and second external electrodes is made from Cu, Fe, Zn, Al, Ni, Pt, Pd, Ag, Au or Sn, or an alloy including at least one of Cu, Fe, Zn, Al, Ni, Pt, Pd, Ag, Au and Sn, and each of the first and second internal electrodes is made from Cu, Fe, Zn, Al, Ni, Pt, Pd, Ag, Au or Sn, or an alloy including at least one of Cu, Fe, Zn, Al, Ni, Pt, Pd, Ag, Au and Sn.

13. The ceramic electronic component according to claim 1, wherein a main component of the dielectric is barium titanate, strontium titanate, calcium titanate, magnesium titanate, strontium barium titanate, calcium barium titanate, calcium zirconate, barium zirconate, calcium zirconate titanate or titanium dioxide.

14. The ceramic electronic component according to claim 1, wherein a main component of each of the first and second base layers is Ni.

15. The ceramic electronic component according to claim 1, wherein each of the first and second base layers has a co-material containing the dielectric as its main component.

16. The ceramic electronic component according to claim 1, wherein an external size of the ceramic electronic component is any one of 0201 size to 5750 size.

17. The ceramic electronic component according to claim 1, wherein the first internal electrode includes at least one first internal electrode layer and the second internal electrode includes at least one second internal electrode layer such that the at least one first and second internal electrode layers are alternately stacked, with a dielectric layer containing the dielectric being interposed between each of the at least one first internal electrode layer and each of the at least one second internal electrode layer,
 the first external electrode is connected to the at least one first internal electrode layer, and
 the second external electrode is provided separately from the first external electrode and is connected to the at least one second internal electrode layer.

18. The ceramic electronic component according to claim 17, wherein the element body has a length direction perpendicular to said opposite side faces and a width direction in a direction perpendicular to the length direction, the element body further includes an upper cover layer that contains the dielectric and a lower cover layer that contains the dielectric such that the upper cover layer is provided on top of a stack of the at least one first and second internal electrode layers and the lower cover layer is provided below said stack,
 the at least one first surface of the element body includes a surface of the upper cover layer and a surface of the lower cover layer, the at least one first step or inclined surface includes two first steps or inclined surfaces, the at least one second step or inclined surface includes two second steps or inclined surfaces, one of the two first steps or inclined surfaces is formed on the surface of the upper cover layer and the other is formed on the surface of the lower cover layer, and one of the two second steps of inclined surfaces is formed on the surface of the upper cover layer and the other is formed on the surface of the lower cover layer, and
 the element body further includes a pair of margin portions that contain the dielectric and sandwich said stack of the at least one first and second internal electrode layers in the width direction of the element body,
 a third step or inclined surface is formed on a surface of one of the pair of margin portions such that an edge of the first plating layer is present on the surface of the one of the pair of margin portions at a position different from a position of the edge of the first base layer in the width direction of the element body,
 a fourth step or inclined surface is formed on a surface of the other of the pair of margin portions such that an edge of the first plating layer is present on the surface of the other of the pair of margin portions at a position different from a position of the edge of the first base layer in the width direction of the element body, a fifth step or inclined surface is formed on the surface of the one of the pair of margin portions such that an edge of the second plating layer is present on the surface of the one of the pair of margin portions at a position different from a position of the edge of the second base layer in the width direction of the element body, a sixth step or inclined surface is formed on a surface of the other of the pair of margin portions such that an edge of the second plating layer is present on the surface of the other of the pair of margin portions at a position different from a position of the edge of the second base layer in the width direction of the element body.

19. An arrangement comprising:

a mounting substrate;

at least one solder layer attached to the mounting substrate; and the ceramic electronic component as set forth in claim 1, mounted on the mounting substrate via the at least one solder layer.

* * * * *